Dec. 10, 1963  B. V. JANAKIRAMA-RAO  3,113,877
PARTIALLY DERITRIFIED GLASSES
Filed Oct. 6, 1960  3 Sheets-Sheet 1

INVENTOR.
Bhogaraju V. Janakirama-Rao
BY
Donald L. Cohen
ATTORNEY

INVENTOR.
Bhogaraju V. Janakirama-Rao

ATTORNEY

United States Patent Office 3,113,877
Patented Dec. 10, 1963

3,113,877
PARTIALLY DEVITRIFIED GLASSES
Bhogaraju V. Janakirama-Rao, Philadelphia, Pa., assignor to International Resistance Company, Philadelphia, Pa.
Filed Oct. 6, 1960, Ser. No. 60,853
6 Claims. (Cl. 106—52)

The present invention relates to ceramics, and more particularly to partially devitrified glasses.

Completely vitrified ceramics, i.e. glasses, have a great many uses. However, the physical properaties, such as mechanical strength and ability to withstand heat, and the electrical properties, such as dielectric constant and dissipation factor, of glasses have limited the use of glass. Although, the previously mentioned physical and electrical properties of the semi-crystalline ceramics, such as porcelain, refractory bodies and the like, are better than that of glass, the semi-crystalline ceramics have a disadvantage over glasses in the manner that they are made.

Glasses can be melted so that glass objects of various shapes can be made relatively easily in properly shaped molds. Also, glass objects can be made quickly so that many of such objects can be inexpensively mass produced. However, the method of making the semi-crystalline ceramic objects is relatively slow and comprises many steps including forming, drying and firing. Therefore, it would be desirable to have a ceramic which could be made in the same manner as glasses, but which would have improved physical and electrical properties.

It is an object of the present invention to provide a novel ceramic.

It is another object of the present invention to provide a novel ceramic having physical and electrical properties better than those of a corresponding glass, but which can be made in a manner similar to a glass.

It is a further object of the present invention to provide a partially devitrified glass.

It is still a further object of the present invention to provide a glass having a controlled amount of devitrification to improve the properties of the glass.

Other objects will appear hereinafter.

The invention accordingly comprises a composition of matter possessing the characteristics, properties, and the relation of constituents which will be exemplified in the composition hereinafter described, and the scope of the invention will be indicated in the claims.

For a fuller understanding of the nature and objects of the invention, reference should be had to the following detailed description taken in connection with the accompanying drawings in which.

Figure 1:
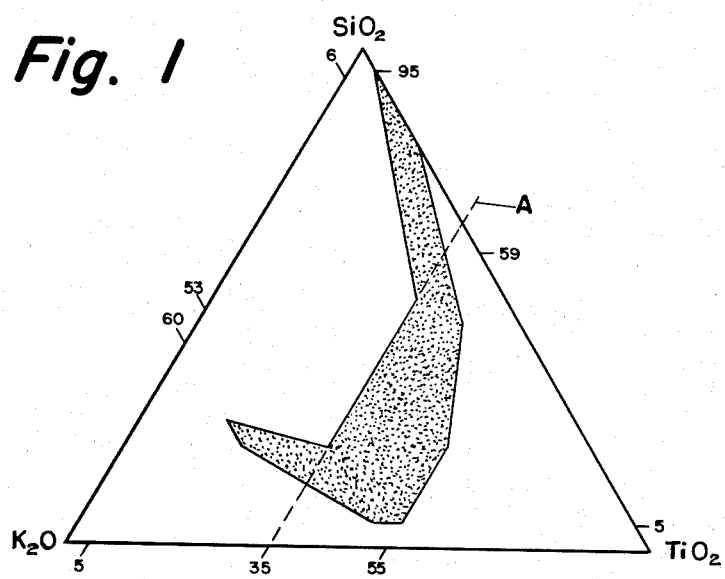
FIGURE 1 is a triaxial diagram showing the ranges in percent by weight of the ingredients used to form the silica, potash, titanium oxide glass system of the present invention, with the shade area indicating ranges over which the partially devitrified glass of the present invention is formed.

Heretofore, the phenomenon of devitrification or phase separation in glass has been considered undesirable, and therefore avoided, since complete devitrification resulted in a solid formed mainly of a mass of crystals with little or no adhering bond. However, I have discovered that if devitrification is deliberately induced according to plan, and the amount of devitrification controlled, the resultant article will have improved properties, such as a higher deformation temperature, better reflectivity, opacity, and better electrical properties, such as dielectric constant, and dissipation factor. Although any glass composition theoretically, devitrifies if held long enough at its devitrification temperature, this manner of devitrification to obtain a controlled amount of devitrification is commercially uneconomical since the heat treatment to achieve this manner of devitrification could extend to hundreds or thousands of hours. However, I have discovered that by introducing certain nucleating agents, such as titanium oxide ($TiO_2$), tantalum oxide ($Ta_2O_5$) and niobium oxide ($Nb_2O_5$), into certain base glass compositions, such as a silica-potash or a germanium oxide-potash composition, and by properly heating such glasses, it is possible to make glasses with a controlled amount of devitrification and with improved physical, chemical and electrical properties within commerically feasible time limits.

In general, the glasses of the present invention are made by mixing together and placing in a refractory crucible or tank furnace the finely powdered batch components in the form of oxides, carbonates, nitrates, or other compounds which will yield when melted the required amount of cation content, such batch components being of an amount sufficient to provide the proper percentage calculated on weight percent of oxide basis. The crucible and its contents are then heated in a furnace to a temperature sufficient to melt the contents, and the contents of the crucible are maintained at such temperature for a period sufficient to insure complete melting of the batch components. The molten glass is then formed into desired shapes using well known forming techniques, such as pressing, drawing, blowing, etc. The formed objects of the glass of the present invention may then be annealed using well known annealing techniques. Such annealing includes heating the glass object to the annealing temperature, and maintaining the object at the annealing temperature for a period of time sufficient to permit relief of the strains in the glass. The glass object is then cooled at a rate to prevent excessive strains from reforming in the glass. Up to this point the method of making the glasses of the present invention follows the well known, conventional practice for making glasses. At this stage in the making of the glass of the present invention, the glass is completely vitrified and is transparent.

To form the partially devitrified glass of the present invention, the glass object is heated to a temperature of from 100° F. to 300° F. above the annealing temperature of the glass, and held at such temperature from 1 to 4 hours to initiate nucleation. Such nucleation consists of myriads of ultramicroscopic nuclei being formed in the glass by the nucleating cations. The glass article is then heated to a temperature slightly above the deformation temperature of the object in its completely vitrified, glassy state, and held at such temperature from 1 to 4 hours. At this stage in the method of the present invention, the nuclei previously formed in the glass object develop into relatively larger crystals because of phase separation. The crystals formed provide the object with sufficient rigidity that the object does not sag even when held for long periods of time at a temperature considerably above the deformation temperature of the object in its completely vitrified, glassy state. The amount of time that the object is held at its phase separation temperature will determine the amount of devitrification so that such devitrification can be easily controlled. Thus, by controlling the time that the object is maintained at its nucleation temperature and at its phase separation temperature, the amount of devitrification of the object can be controlled to achieve an object having the desired properties.

Figure 5:
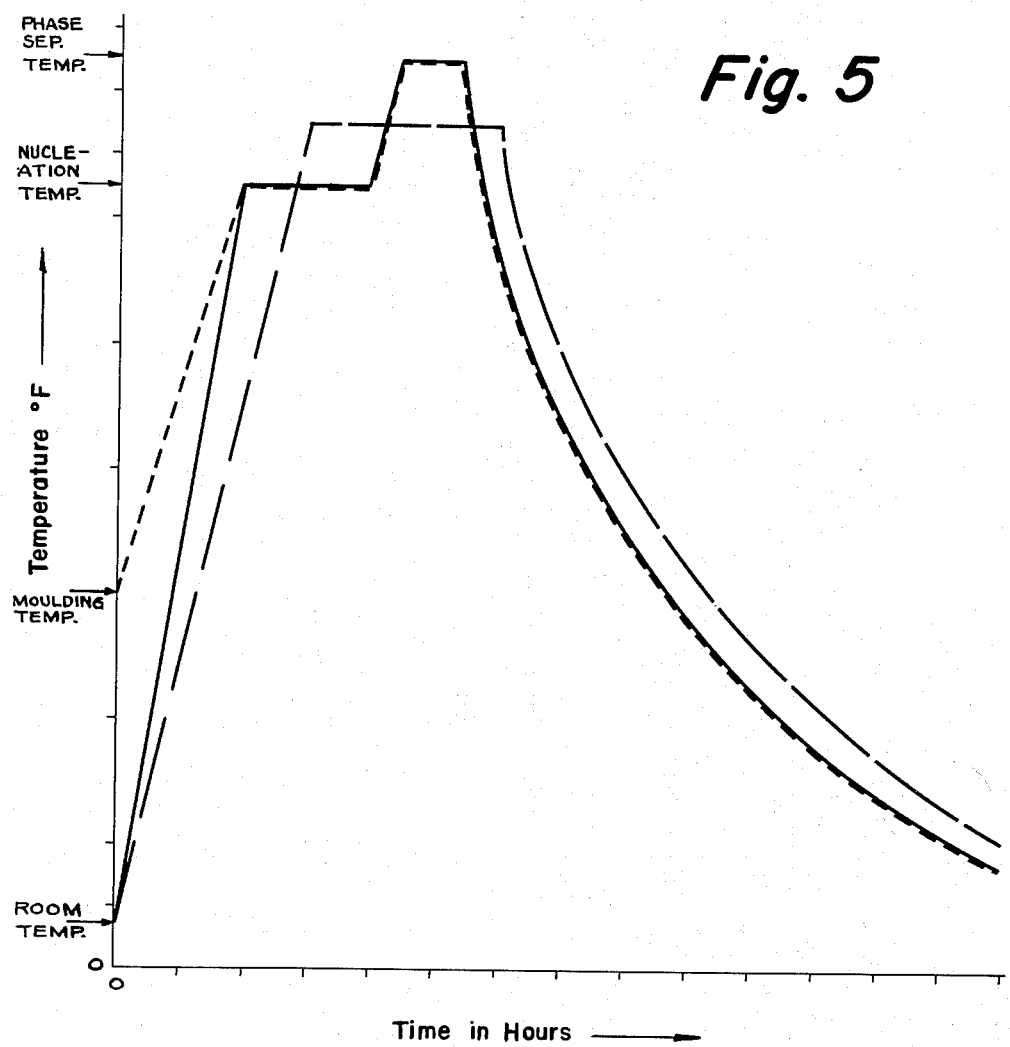
FIGURE 5 is a graph illustrating various heat treatment schedules for obtaining the partially devitrified glasses of the present invention.

The heat treatment just described for converting a completely vitrified glass of the present invention to a partially devitrified glass is a two step process which is illustrated as curve A in FIGURE 5. As previously described and as shown in FIGURE 5, the glass is heated from room temperature to the nucleation temperature of the glass, and is maintained at the nucleation temperature for a period of time. The glass is then heated to its phase separation temperature, and held at this temperature for a period of time sufficient to obtain the desired devitrification. The glass is then cooled at a relatively slow rate. Instead of this two step heat treatment, a controlled devitrification of the glass of the present invention can be obtained by a one step process which is illustrated by curve B in FIGURE 5. This one step process comprises heating the formed glass object at a relatively slow rate, such as at a rate of 200 to 300° F. per hour, from room temperature to a temperature between the nucleating temperature and the phase separation temperature of the glass. The glass is maintained at this intermediate temperature for a period substantially equal to the total time that the glass would be maintained at the nucleation temperature and the phase separation temperature in the two step process, so as to permit nucleation and phase separation at one time. The partially devitrified glass is then cooled at a relatively slow rate.

In the one and two step heat treatment schedules heretofore described, the heat treatment was started with the glass object being at room temperature. However, as illustrated by curve C in FIGURE 5, the heat treatment of the glasses of the present invention can be applied to the glasses straight from the hot forming molds without prior annealing of the articles and cooling of the glass articles to room temperature. As illustrated by curve C, the glass object can be subjected to the two step heat treatment schedule similar to that illustrated by curve A, but with the glass object being heated to is nucleation temperature directly from the hot forming mold. This heat treatment schedule is the most economical of the three heat treatment schedules illustrated in FIGURE 5 since it eliminates the need for annealing the glass object, and reduces the time required to heat the glass object to its nucleation temperature.

More specifically, a partially devitrified glass of the present invention may be obtained from a base composition of silica and potash using titanium oxide as the nucleating agent. Referring to FIGURE 1, there is shown a triaxial diagram illustrating the percent by weight of oxides in a batch which yields upon the proper heat treatment such a partially devitrified glass of the present invention. As shown therein, the compounds may be present in the batch in the following ranges in percent by weight of the total batch: Silica ($SiO_2$) 5 to 95%, potash ($K_2O$) 0 to 60% and titanium oxide ($TiO_2$) 5 to 55%.

It is preferrtd to form the partially devitrified glass of the present invention from a composition containing a minimum of approximately 35% by weight of titanium oxide. Thus, a more preferred range of the compounds is as follows: Silica 5 to 59%, potash 6 to 53% and titanium oxide 35 to 55%. The preferred range of the compounds is the major portion of the shaded area in the triaxial diagram of FIGURE 1 which is on the right hand side of the line A. This range of the compounds is preferred since the compositions of the glass in the shaded areas projecting to the left hand side of line A in FIGURE 1 are difficult to form.

Although the glasses described herein are specified in terms of the percent of oxides of the various cations in the batch from which the glass is formed, and although the oxide forms are generally used in glass making, the exact compound in which the ions are introduced is of minor importance in most glasses. Thus, the cations may be introduced as nitrates, oxolates or other chemical compounds. Therefore, it is to be understood that whenever oxides are mentioned as constituents of a glass batch, other compounds containing the same cations may also be used.

Referring to Table I, Examples 1 through 5 are specific compositions of the silica-potash-titanium oxide glass of the present invention. The glasses of Examples 1 through 5 can be made in the manner previously described using the two step heat treatment illustrated by curve A in FIGURE 5, and using the various temperatures shown in Table II. For example, the glass of Example 1, which contains 50% silica, 15% potash and 35% titanium dioxide, can be made by mixing the ingredients together, placing them in a crucible and heating the ingredients to a melting temperature of 2700° F. When the ingredients are completely melted, the molten glass is poured into a steel mold which is at a temperature of 300° C. The formed glass article is then annealed by heating the article to a temperature of 1100° F., and soaking the article at such a temperature for a period of 1 hour. The glass article is then cooled at a rate of approximately 200° F. per hour. At this point, the glass article is a transparent, completely vitrified glass. To form the partially devitrified glass of the present invention, the glass object is then heated to a nucleation temperature of 1350° F., and held at the nucleation temperature for a period of one-half hour to permit the formation of the nuclei. The glass object is then heated to a phase separation temperature of 1450° F., and held at such a phase separation temperature for a period of one-quarter of an hour to permit partial devitrification of the glass. The glass object is then cooled at a rate of 100° F. per hour to room temperature. The glasses of Examples 2 through 5 can be similarly formed using the temperatures shown in Table II.

Table III shows some of the properties of the glass compositions of the present invention before and after the glass is subjected to the heat treatment to partially devitrify the glass in accordance with the present invention. As shown in Table III, the glass composition of the present invention of Example 1 has a deformation temperature prior to the heat treatment, i.e. as a completely vitrified glass, of 1365° F., whereas its deformation temperature after being subjected to the heat treatment and being partially devitrified is 1750° F. The dielectric constant of the glass of Example 1 before the heat treatment is 10, whereas after the heat treatment the partially devitrified glass has a dielectric constant of 10.7. As can be seen from Table III, the glasses of Examples 2 through 5 likewise have increased deformation temperatures and dielectric constants after being partially devitrified by the heat treatment of the present invention. Thus, the partially devitrified glasses of the present invention have improved physical and electrical properties over the same compositions which are in their completely vitrified state.

*Table I*

|  | 1 | 2 | 3 | 4 | 5 | 6 | 7 | 8 |
|---|---|---|---|---|---|---|---|---|
| $SiO_2$ | 50 | 40 | 35 | 35 | 30 | 15 | 20 | ----- |
| $K_2O$ | 15 | 20 | 20 | 25 | 25 | 15 | 20 | ----- |
| $TiO_2$ | 35 | 40 | 45 | 40 | 45 | ----- | ----- | 25 |
| $GeO_2$ | ----- | ----- | ----- | ----- | ----- | ----- | ----- | 25 |
| $Ta_2O_5$ | ----- | ----- | ----- | ----- | ----- | ----- | 60 | 50 |
| $Nb_2O_5$ | ----- | ----- | ----- | ----- | ----- | 70 | ----- | ----- |

Table II

|  | 1 | 2 | 3 | 4 | 5 | 6 | 7 | 8 |
|---|---|---|---|---|---|---|---|---|
| Melting Temp., °F | 2,700 | 2,500 | 2,400 | 2,500 | 2,400 | 2,550 | 2,600 | 2,400 |
| Annealing Temp., °F (1 hr. soak) | 1,100 | 1,050 | 1,050 | 1,000 | 1,000 | 1,000 | 1,050 | 900 |
| Nucleation Temp., °F | 1,350 | 1,300 | 2,200 | 1,250 | 1,100 | 1,225 | 1,325 | 1,150 |
| Nucleation Soak Time (Hrs.) | ½ | 4 | 4 | 4 | 4 | ½ | ¾ | ¾ |
| Phase Separation Temp., °F | 1,450 | 1,450 | 1,250 | 1,450 | 1,200 | 1,350 | 1,450 | 1,300 |
| Soak Time (Hrs.) | ¼ | 2 | 2 | 2 | 2 | 2 | 2 | 1 |
| Cooling Rate, °F./hr | 100 | 100 | 100 | 100 | 100 | 100 | 100 | 100 |

Table III

|  | Deformation Temp., °F. | | Dielectric Constant | | Density | |
|---|---|---|---|---|---|---|
|  | Before | After | Before | After | Before | After |
| 1 | 1,365 | 1,750 | 10 | 10.7 | | |
| 2 | 1,300 | 1,600 | 10.6 | 11 | | |
| 3 | 1,285 | 1,550 | 11.4 | 13.1 | | |
| 4 | 1,240 | 1,500 | 10.7 | 11 | 2.78 | 2.74 |
| 5 | 1,240 | 1,500 | 11.5 | 13 | 2.83 | 2.75 |

Figure 2:
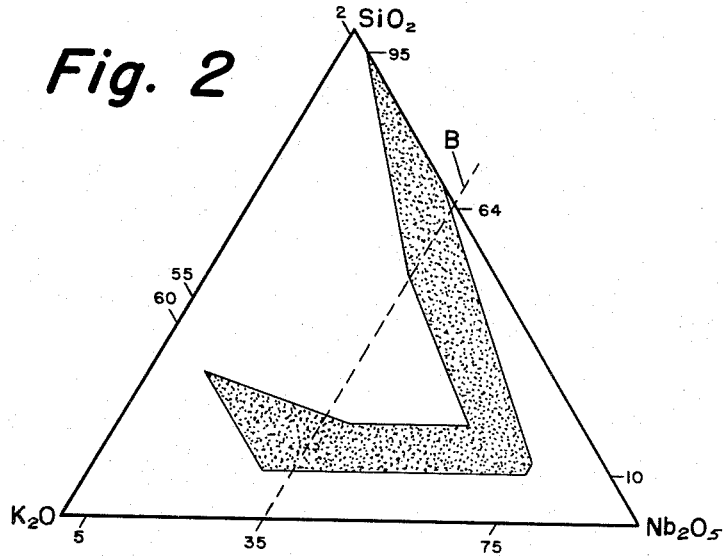
FIGURE 2 is a triaxial diagram similar to FIGURE 1 for a silica, potash, niobium oxide glass system of the present invention.

FIGURE 2 is a triaxial diagram of a silica-potash glass of the present invention using niobium oxide as the nucleating agent. As shown therein, the compounds may be present in this glass of the present invention in the following ranges as percent by weight of the total: Silica ($SiO_2$) 10 to 95%, potash ($K_2O$) 0 to 60% and niobium oxide ($Nb_2O_5$) 5 to 75%. As when using titanium oxide as the nucleating agent, it is preferred to form the partially devitrified glass of the present invention from a composition containing a minimum of approximately 35% by weight of niobium oxide. Thus, a more preferred range of the compounds, as indicated by the shaded area to the right hand side of the line B in FIGURE 2, is as follows: Silica 10 to 64%, potash 2 to 55% and niobium oxide 35 to 75%.

Referring to Table I, Example 6 is a specific composition of a silica-potash-niobium oxide glass of the present invention. Such a partially devitrified glass of the present invention is made in substantially the same manner as previously described using the various temperature conditions set forth in Table II. Thus, the glass of Example 6, which consists of 15% silica, 15% potash and 70% niobium oxide, can be made by mixing the ingredients together, placing them in a crucible and heating the ingredients to a melting temperature of 2550° F. When the ingredients are completely melted, the molten glass is molded in a heated steel mold to form a glass article of the desired shape. The molded glass article is then annealed by heating the article to an annealing temperature of 1000° F. and maintaining the article at such an annealing temperature for approximately 1 hour. The article is then cooled at a rate of approximately 200° F. per hour. The glass so formed is a transparent, completely vitrified glass. To form the partially devitrified glass of the present invention, the glass article is heated to a nucleation temperature of 1225° F., and held at such nucleation temperature for a period of approximately ½ hour. The glass article is then further heated to a phase separation temperature of 1350° F., and maintained at such a phase separation temperature for approximately 2 hours to permit partial devitrification of the glass article. The partially devitrified glass article is then cooled at a rate of approximately 100° F. per hour to complete the formation of the partially devitrified glass of the present invention.

Figure 3:
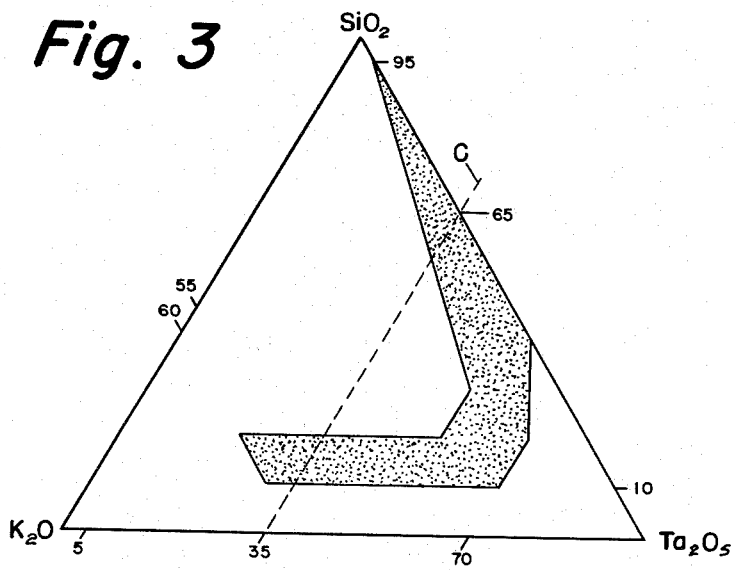
FIGURE 3 is a triaxial diagram similar to FIGURE 1 for a silica, potash, tantalum oxide glass system of the present invention.

In addition to titanium oxide and niobium oxide, I have found that tantalum oxide can also be used as a nucleating agent. FIGURE 3 is a triaxial diagram of a silica-potash base glass using tantalum oxide as the nucleating agent. As shown in FIGURE 3, such a glass has a range of composition of its components based on percent by weight of the oxides as follows: Silica ($SiO_2$) 10 to 95%, potash ($K_2O$) 0 to 60% and tantalum oxide ($Ta_2O_5$) 5 to 70%. As when using titanium oxide or niobium oxide as the nucleating agent, it is preferred that the partially devitrified glass of the present invention contain a minimum of approximately 35% of tantalum oxide. Thus, the preferred range of composition, as indicated by the shaded area to the right hand side of line C in FIGURE 3, is as follows: Silica 10 to 65%, potash 0 to 55% and tantalum oxide 35 to 70%.

Example 7 in Table I is a specific composition of the silica-potash-tantalum oxide glass of the present invention. As indicated in Table II, a partially devitrified glass of the present invention can be made from the composition of Example 7, which is 20% silica, 20% potash and 60% tantalum oxide, by mixing the ingredients together, placing them in a crucible and heating the ingredients to a melting temperature of 2600° F. After the ingredients are completely melted, the molten glass is cast into a desired shape in a heated steel mold. The formed glass object is then annealed by heating the object to an annealing temperature of 1050° F., and maintaining the object at such an annealing temperature for approximately one hour. The glass object is then cooled at a rate of approximately 200° F. per hour until the object reaches room temperature. To partially devitrify the glass object, the object is subjected to the heat treatment of heating the object to a nucleation temperature of approximately 1325° F., and maintaining the glass object at such a temperature for approximately ¾ of an hour. The glass object is then heated to a phase separation temperature of 1450° F. and maintained at such phase separation temperature for approximately two hours. The object is then cooled at a rate of approximately 100° F. per hour until the partially devitrified glass object of the present invention reaches room temperature.

Figure 4:
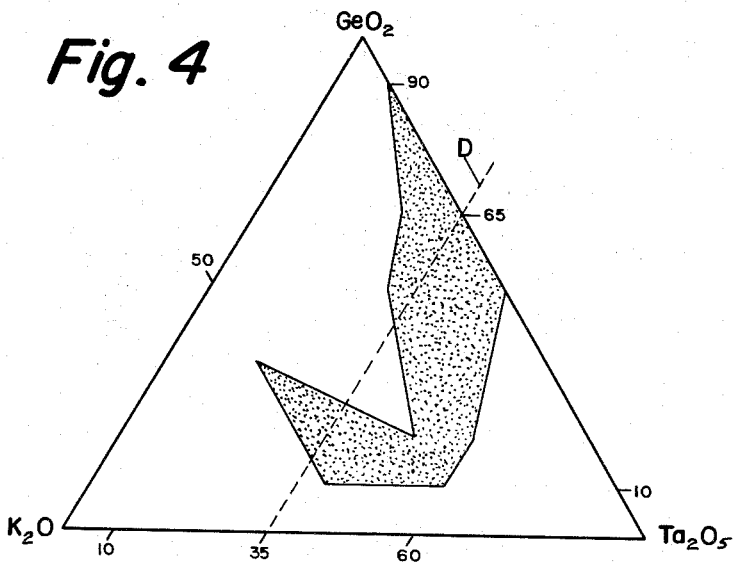
FIGURE 4 is a triaxial diagram similar to FIGURE 1 for a germanium oxide, potash, tantalum oxide glass system of the present invention.

Another base glass which can be formed as a partially devitrified glass using the nucleating agents of the present invention when subjected to the heat treatment of the present invention, is shown in FIGURE 4. Such a base glass is a germanium oxide-potash glass, and as shown in FIGURE 4 uses tantalum oxide as the nucleating agent. The range of composition of the components of such a glass which can be formed as a partially devitrified glass of the present invention is as follows: Germanium oxide ($GeO_2$) 10 to 90%, potash ($K_2O$) 0 to 50% and tantalum oxide ($Ta_2O_5$) 10 to 60%. A preferred range of composition which uses a minimum of approximately 35% of the tantalum oxide nucleating agent is illustrated by the shaded area to the right hand side of line D in FIGURE 4, and is as follows: Germanium oxide 10 to 65%, potash 0 to 50% and tantalum oxide 35 to 60%.

Example 8 in Table I is a specific composition of the germanium oxide-potash-tantalum oxide glass of the present invention which can be formed as a partially devitrified glass. As indicated in Table II, the glass of Example 8, which is 25% germanium oxide, 25% potash and 50% tantalum oxide, can be formed as a partially devitrified glass by mixing the ingredients together, placing them in a crucible and heating the ingredients to a melting temperature of 2400° F. When the ingredients are completely melted, the molten glass is cast into a desired shape in a heated steel mold. The formed glass object can then be annealed by heating the object to an annealing temperature of 900° F. and maintaining the object at such a temperature for a period of approximately one hour. The glass object is then cooled at a rate of approximately 200° F. per hour until the object reaches room temperature. The annealed glass object is then subjected to the heat treatment of the present invention by heating the glass object to a nucleation temperature of 1150° F., and maintaining the glass object at such a temperature for approximately three-quarters of an hour. The temperature of the glass object is then increased to the phase separation temperature of 1300° F., and the glass object is maintained at the phase separation temperature for approximately one hour to permit partial devitrification. The partially devitrified glass object is then cooled at a rate of approximately 100° F. per hour until the glass reaches room temperature.

Although Table III shows the improvement in the specific properties of the glasses of Examples 1 to 5, it should be understood that the partially devitrified glasses of Examples 6, 7 and 8 have similar improvements in their properties. Thus, each of the partially devitrified glasses of the present invention has a higher deformation temperature and a higher dielectric constant than the same glass in its completely vitrified form.

The present invention may be embodied in other specific forms without departing from the spirit or essential attributes thereof and, accordingly, reference should be made to the appended claims, rather than to the foregoing specification as indicating the scope of the invention.

I claim:

1. A partially devitrified glass consisting essentially of by weight 5 to 65% silica, 0 to 55% potash and a nucleating agent selected from the group consisting of 35 to 55% titanium oxide, 35 to 75% niobium oxide and 35 to 70% tantalum oxide.

2. A partially devitrified glass consisting essentially of by weight 5 to 59% silica ($SiO_2$), 6 to 53% potash ($K_2O$) and 35 to 55% titanium oxide ($TiO_2$).

3. A partially devitrified glass consisting essentially of by weight 10 to 64% silica ($SiO_2$), 2 to 55% potash ($K_2O$) and 35 to 75% niobium oxide ($Nb_2O_5$).

4. A partially devitrified glass consisting essentially of by weight 10 to 65% silica ($SiO_2$), 0 to 55% potash ($K_2O$) and 35 to 70% tantalum oxide ($Ta_2O_5$).

5. A partially devitrified glass consisting essentially of by weight 10 to 90% germanium oxide ($GeO_2$), 0 to 50% potash ($K_2O$) and 10 to 60% tantalum oxide ($Ta_2O_5$).

6. A partially devitrified glass consisting essentially of by weight 10 to 65% germanium oxide ($GeO_2$), 0 to 50% potash ($K_2O$) and 35 to 60% tantalum oxide ($Ta_2O_5$).

References Cited in the file of this patent

UNITED STATES PATENTS

| | | |
|---|---|---|
| 1,607,817 | Dennis | Nov. 23, 1926 |
| 2,425,403 | Sun | Aug. 12, 1947 |
| 2,920,971 | Stookey | Jan. 12, 1960 |